(12) United States Patent
Meerbeek et al.

(10) Patent No.: US 10,869,292 B2
(45) Date of Patent: Dec. 15, 2020

(54) CONDITIONALLY PROVIDING LOCATION-BASED FUNCTIONS

(71) Applicant: SIGNIFY HOLDING B.V., Eindhoven (NL)

(72) Inventors: Berent Willem Meerbeek, Veldhoven (NL); Bas Driesen, Weert (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/611,024

(22) PCT Filed: Apr. 30, 2018

(86) PCT No.: PCT/EP2018/061048
§ 371 (c)(1),
(2) Date: Nov. 5, 2019

(87) PCT Pub. No.: WO2018/202629
PCT Pub. Date: Nov. 8, 2018

(65) Prior Publication Data
US 2020/0187147 A1    Jun. 11, 2020

(30) Foreign Application Priority Data
May 5, 2017 (EP) .................................. 17169608

(51) Int. Cl.
*H04W 4/80* (2018.01)
*H04W 64/00* (2009.01)
*H04W 4/029* (2018.01)
*H04W 4/02* (2018.01)

(52) U.S. Cl.
CPC ......... *H04W 64/003* (2013.01); *H04W 4/023* (2013.01); *H04W 4/029* (2018.02); *H04W 4/80* (2018.02)

(58) Field of Classification Search
CPC .............................. H04W 64/00; G06Q 10/06
See application file for complete search history.

(56) References Cited

U.S. PATENT DOCUMENTS

| | | | |
|---|---|---|---|
| 2008/0238661 A1 | 10/2008 | Camp et al. | |
| 2014/0329537 A1 | 11/2014 | Huang | |
| 2015/0181384 A1 | 6/2015 | Mayor et al. | |
| 2016/0088564 A1 | 3/2016 | Ahmadzadeh et al. | |
| 2017/0238401 A1* | 8/2017 | Sadwick | F21K 9/235 |
| | | | 315/294 |
| 2018/0336002 A1* | 11/2018 | Hansen | H05B 47/105 |

FOREIGN PATENT DOCUMENTS

| | | |
|---|---|---|
| WO | 2016020182 A1 | 2/2016 |
| WO | 2017005502 A1 | 1/2017 |

* cited by examiner

*Primary Examiner* — Michael T Vu
(74) *Attorney, Agent, or Firm* — Meenakshy Chakravorty

(57) ABSTRACT

An electronic device (1) is configured to receive one or more wireless signals from one or more beacon systems (21-23). The one or more wireless signals identify the one or more beacon systems. The electronic device is further configured to identify local beacon systems (21-24) which are present in the same area as the electronic device, e.g. from a manual configuration, determine a quantity of the local beacon systems and/or locations of the local beacon systems, and provide one or more location-based functions based on the one or more wireless signals in dependence on the quantity of the local beacon systems and/or the locations of the local beacon systems.

13 Claims, 7 Drawing Sheets

CONDITIONALLY PROVIDING LOCATION-BASED FUNCTIONS

FIELD OF THE INVENTION

The invention relates to an electronic device for providing location-based functions.

The invention further relates to a method of providing location-based functions.

The invention also relates to a computer program product enabling a computer system to perform such a method.

BACKGROUND OF THE INVENTION

Location-based functions allow users to use functions that depend on or are optimized for the location of the user. Which location-based functions can be provided on a device may be determined by using the location of the device, but may also be determined without using the location of the device, e.g. with the help of beacon systems. U.S. patent application 20080238661 A1 discloses such a system for identifying a location of an electronic device by determining a signal characteristic of a wireless communication from one or more wireless devices (e.g. beacons) to the electronic device. The system comprises two or more short-range devices for communicating with the electronic device to determine its location. Each short-range device may be associated with an area, which enables the electronic device to determine in which area it is located by combining measurements from two or more short-range devices. The location of the electronic device may be used to provide a user with lighting as the user moves around the home.

Many different location-based functions can be envisioned, but with different requirements with regard to location input.

A drawback of conventional devices for providing location-based functions is that users will often enable or invoke a location-based function that does not work or does not work well, because it turns out that the location input is not good enough for this location-based function.

SUMMARY OF THE INVENTION

It is a first object of the invention to provide an electronic device, which reduces the provisioning of location-based functions that do not work or do not work well.

It is a second object of the invention to provide a method, which reduces the provisioning of location-based functions that do not work or do not work well.

In a first aspect of the invention, the electronic device comprises at least one receiver and at least one processor configured to use said at least one receiver to receive one or more wireless signals from one or more beacon systems, said one or more wireless signals identifying said one or more beacon systems, identify local beacon systems which are present in the same area as said electronic device, determine a quantity of said local beacon systems and/or locations of said local beacon systems, and provide one or more location-based functions based on said one or more wireless signals in dependence on said quantity of said local beacon systems and/or said locations of said local beacon systems.

The inventors have recognized that when providing location-based functions based on wireless signals from beacon systems, by providing these location-based functions in dependence on a quantity of local beacon systems and/or locations of local beacon systems, it is possible to prevent that certain location-based functions whose functioning have been found to depend on a quantity of local beacon systems and/or locations of local beacon systems are provided when they are not expected to not work (well). When new beacon systems are installed, new location-based functions may be provided, thereby resulting in a gradual unlock of location-based functions.

The area may be an office or a home, for example. The local beacon systems which are present in the same area may be identified based on the received one or more wireless signals and/or from a manually entered configuration, for example. As an example of the latter, a user may be able to specify devices he owns or uses per area and may be able to associate these devices with an sub-area, e.g. room, of the area. The current area of the electronic device may be manually identified by a user of the electronic device or may be automatically determined, e.g. using GPS and/or mobile positioning technology of a cellular communication network.

A beacon system may comprise one or more devices, e.g. a light with a beacon transmitter incorporated or a light with a separate beacon transmitter attached. The beacon system may transmit the beacon using a first wireless technology, e.g. Bluetooth, while the beacon system is controlled using a second wireless technology, e.g. ZigBee.

Said at least one processor may be configured to determine which location-based functions are available based on said quantity of said local beacon systems and/or said locations of said local beacon systems, and provide a user interface which allows a user of said electronic device to enable or disable at least one of said available location-based functions. A user is typically allowed to enable or disable location-based functions and by already removing location-based functions that are not available in the current area of the electronic device, the enabling and disabling of location-based functions takes less effort.

Certain location-based functions may be provided in dependence on a quantity of local beacon systems and/or locations of local beacon systems, wherein only the local beacon systems that have been determined to be present, e.g. because wireless signals have been received from them, are considered. An example of such a location-based function is the dynamic rendering of light effects so that the light effects seem to move through the room. However, in a certain embodiment, the user can enable such a location-based function in a user interface in dependence on a quantity of local beacon systems and/or locations of local beacon systems, wherein all known local beacon systems, independent of whether they are switched on or off, are considered. Thus, the location-based function may be enabled in the user interface, but not yet provided. For example, dynamic rendering may require at least two beacon systems to be present in the same sub-area. If two beacon systems are present in the current room, but one of the beacon systems has been switched off with a mains switch, the user may be allowed to enable the dynamic rendering function in a user interface, but the function will not be provided yet. When the switched-off beacon system is turned on again, the function may be provided.

Other location-based functions may be provided in dependence on a quantity of local beacon systems and/or locations of local beacon systems, wherein all known local beacon systems, independent of whether they are switched on or off, are considered. An example of such a location-based function is "Follow-me light" in which light settings follow a person from one room to another. This location-based function may be provided in the first of two rooms even if the electronic device does not currently receive wireless signals from a beacon system in the second of the two rooms.

Said at least one processor may be configured to determine which of said one or more beacon systems is closest to said electronic device based on said received one or more wireless signals and provide one or more functions based on which of said of said one or more beacon systems is closest to said electronic device. This provides proximity-based functions like light settings that are rendered on nearby lights and follow the user and like showing light controls (e.g. a color picker) of the light closest to the electronic device.

Said at least one processor may be configured to determine which sub-area of said area said electronic device is currently located in based on said one or more wireless signals and provide one or more functions based on which sub-area of said area said electronic device is currently located in. This provides sub-area-based functions like lights that automatically switch on when the user enters the room and/or switch off when the user leaves the room, light settings that follow the user from room to room, a user interface that automatically changes the current room selection and automatic assignment of a new light to a room.

Said at least one processor may be configured to determine which of said one or more beacon systems is closest to said electronic device based on said received one or more wireless signals and not to provide one or more location-based functions if said closest beacon system is located within a certain distance of another one of said one or more beacon systems. This makes it possible to disable a proximity-based control function if it might not be clear to the user which device it will be able to control.

Said at least one processor may be configured to determine one or more location-based functions to be available in dependence on at least a minimum quantity of said local beacon systems being associated with positions within a sub-area of said area. If positions have been associated with a sub-area, e.g. room, of the current area of the electronic device, certain location-based functions that use these positions may become available, e.g. a dynamic light effect through a room. The positions may have been associated with the sub-area in the afore-mentioned manually entered configuration. The positions may be specified finely, e.g. as (x,y) or (x,y,z) coordinates, or coarsely, e.g. as "front-left" and "back-right", for example. These certain location-based functions may be made available when they are available somewhere in the area. This means that the user may be able to enable them, but they might not be provided right away.

Said at least one processor may be configured to determine which sub-area of said area said electronic device is currently located in based on said one or more wireless signals and provide one or more location-based functions in dependence on at least a minimum quantity of said local beacon systems being associated with positions within said determined sub-area. The afore-mentioned certain location-based functions that use these positions are thus provided when they are available in the current sub-area in which the electronic device is located.

Said at least one processor may be configured to determine one or more location-based functions to be available if at least one of said local beacon systems is associated with a sub-area of said area. Certain location-based functions only work (well) if at least one of the local beacon systems is associated with a sub-area of the area, e.g. a function to switch on lights when a person enters the sub-area and switch off the lights when the person leaves the sub-area.

Said at least one processor may be configured to determine one or more location-based functions to be available if at least two of said local beacon systems are associated with different sub-areas of said area. Certain location-based functions only work (well) if at least two of the local beacon systems are associated with different sub-areas of the area, e.g. a follow-me function that allows a user to take his light settings to another room.

Said at least one processor may be configured to determine which sub-area of said area said electronic device is currently located in based on said one or more wireless signals and provide one or more location-based functions in dependence on at least one of said local beacon systems being associated with said determined sub-area. This makes automatic commissioning of devices, e.g. lights, possible, i.e. automatically assigning a new device, e.g. light, to a sub-area, e.g. room, when it is installed.

Said at least one processor may be configured to identify an sub-area of said area per beacon system for said one or more beacon systems, determine an average received signal strength per sub-area for said identified sub-areas, determine which of said average received signal strengths is highest, determine a quantity of beacon systems in the sub-area with the highest average received signal strength and provide one or more location-based functions in dependence on said determined quantity of beacon systems. The sub-area with the highest average received signal strength may be assumed to be the sub-area in which the electronic device is located, but the reliability of this assumption may depend on the quantity of beacon systems in this sub-area.

For example, if the highest average received signal strength was received from a single beacon system, there is a higher probability that this single beacon system is near the electronic device, but at another side of a wall. Some location-based functions require a sub-area to be determined with a higher reliability than other functions. For example, for automatically switching on/off the lights in a room based on the average received signal strength in a room, a relatively high quantity of beacon systems per room might be required, while for an automatic sorting of rooms in a list in the user interface, less beacon systems per room might be required, as the function is less critical.

In a second aspect of the invention, the method of providing location-based functions comprises receiving, on an electronic device, one or more wireless signals from one or more beacon systems, said one or more wireless signals identifying said one or more beacon systems, identifying local beacon systems which are present in the same area as said electronic device, determining a quantity of said local beacon systems and/or locations of said local beacon systems, and providing one or more location-based functions on said electronic device based on said one or more wireless signals in dependence on said quantity of said local beacon systems and/or said locations of said local beacon systems. The method may be implemented in hardware and/or software.

The method may further comprise determining which location-based functions are available based said quantity of said local beacon systems and/or said locations of said local beacon systems and providing a user interface which allows a user to enable or disable at least one of said available location-based functions.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations comprising: receiving, on an electronic device, one or more wireless signals from one or more beacon systems, said one or more wireless signals identifying said one or more beacon systems, identifying local beacon systems which are present in the same area as said electronic device, determining a quantity of said local beacon systems and/or locations of said local beacon systems, and providing one or more location-based functions on said electronic device based on said one or more wireless signals in dependence on said quantity of said local beacon systems and/or said locations of said local beacon systems.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java(™), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
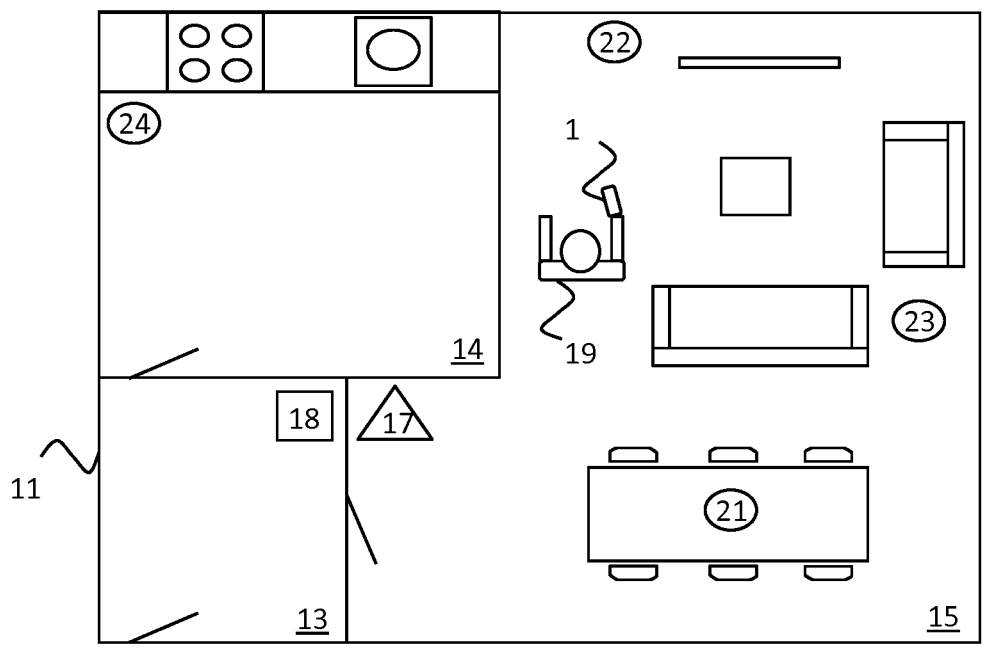
FIG. 1 shows a first example of beacon systems present in an area.

FIG. 1 shows a first example of a area in which the electronic device of the invention may be used: a home 11 with a hall 13, a kitchen 14 and a living room 15. The kitchen 14 comprises a light 24. The living room 15 comprises three lights: a light 21 above a dinner table, a light 22 near a Television and a light 23 near a couch. A person 19 is standing in the living room 15 holding his electronic device, i.e. mobile device 1.

Figure 2:
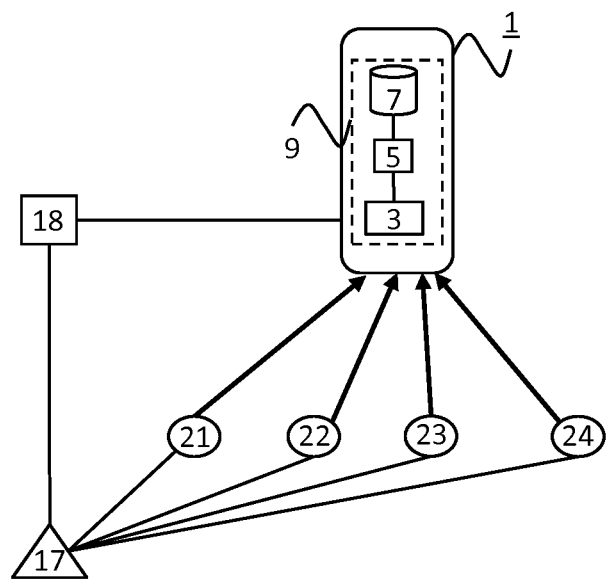
FIG. 2 is a block diagram of a first embodiment of the electronic device of the invention.

The mobile device 1 comprises a receiver 3 and a processor 5, see FIG. 2. The processor 5 is configured to use the receiver 3 to receive one or more wireless signals from one or more beacon systems, e.g. lights 21, 22 and 23. It is assumed that the wireless signal transmitted by light 24 weakens considerably when passing the wall between kitchen 14 and living room 15 and is not strong enough to be received by the receiver 3 of mobile device 1. The one or more wireless signals identify the one or more beacon systems. The processor 5 is further configured to identify local beacon systems, e.g. lights 21 to 24, which are present in the same area as the mobile device 1, and determine a quantity of the local beacon systems, e.g. lights 21 to 24, and/or locations of the local beacon systems, e.g. lights 21 to 24. The processor 5 is also configured to provide one or more location-based functions based on the one or more wireless signals in dependence on the quantity of the local beacon systems, e.g. lights 21 to 24, and/or the locations of the local beacon systems, e.g. lights 21 to 24.

The lights 21 to 24 may transmit their wireless (beacon) signals using Bluetooth, for example. The lights 21 to 24 may be controllable via a bridge 18, e.g. a Philips Hue bridge. The lights 21 to 24 and the bridge 18 may communicate using ZigBee, for example. The electronic device 1 may be connected to the Internet via wireless LAN access point 17 and may be able to control lights 21 to 24 via wireless LAN access point 17 and bridge 18. In an alternative embodiment, the mobile device 1 may be able to control lights 21 to 24 without the use of a bridge.

In the embodiment shown in FIG. 2, the mobile device 1 comprises one processor 5. In an alternative embodiment, the mobile device 1 comprises multiple processors. The processor 5 of the mobile device 1 may be a general-purpose processor, e.g. from ARM or Qualcomm, or an application-specific processor. The processor 5 of the mobile device 1 may run an iOS, Windows or Android operating system for example. The invention may be implemented using a computer program running on one or more processors. The receiver 3 may use Bluetooth to receive the one or more wireless signals from the one or more beacon systems, for example. The receiver 3 may be part of a transceiver. The receiver 3 or the transceiver comprising receiver 3 may further use Wi-Fi to receive wireless signals from and/or transmit wireless signals to the wireless LAN access point 17. The receiver 3 may alternately or simultaneously receive Bluetooth and Wi-Fi signals. Alternatively, a separate Wi-Fi transceiver component may be used. In the embodiment shown in FIG. 2, the mobile device 1 further comprises a memory 7, e.g. for storing apps and data, and a display 9. The memory 7 may comprise one or more memory units. The memory 7 may comprise solid state memory, for example. The display 9 may comprise a LCD or OLED display panel, for example. The display 9 may be a touch screen, for example. The processor 5 may use this touch screen to provide a user interface, for example.

Figure 3:
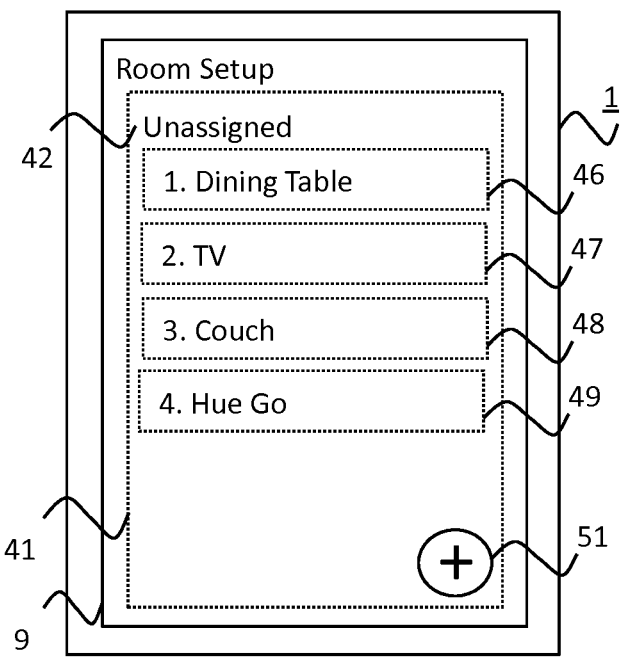
FIG. 3 shows a first example screen of a user interface for associating local beacon systems with an area.

The user of the mobile device 1, i.e. person 19, may be able to manually indicate the area he is in, e.g. indicate that he is in his home 11. Alternatively, the mobile device 1 may automatically determine the area it is in, e.g. using GPS. In this case, the user of the mobile device 1 may have previously associated his home 11 with certain GPS coordinates, for example. The user of the mobile device 1 may associate lights with his home using an app running on his mobile device 1, for example. A first example screen of a user interface of this app is shown in FIG. 3.

A "Room Setup" screen 41 is displayed on display 9 of the mobile device 1. A single group 42 of lights titled "Unassigned" and four lights are shown. The first light is shown in sub-area 46 under the name "1. Dining Table". The second light is shown in sub-area 47 under the name "2. TV". The third light is shown in sub-area 48 under the name "3. Couch". The fourth light is shown in sub-area 49 under the name "4. Hue Go". All four lights have not been assigned to a room yet. New lights may be added by pressing a button 51. When the user presses button 51, a scan for lights that are not listed in the user interface yet may be performed. This scan may involve contacting the bridge 18. New lights may automatically be added to group 42 ("Unassigned").

In the embodiment shown in FIG. 1, the lights 21 to 24 have an embedded beacon. In an alternative embodiment, a stand-alone beacon is attached to one or more of lights 21 to

24. This standalone beacon may be associated with the light to which it is attached in the user interface shown in FIG. 3.

The following types of location-based functions may be provided, for example, based on the wireless signals received from the one or more beacon systems:

1. Proximity-based. The processor 5 may be configured to determine which of the one or more beacon systems is closest to the electronic device 1 based on the received one or more wireless signals and provide one or more functions based on which of the of the one or more beacon systems is closest to the electronic device.

2. Sub-area-based. The processor 5 may be configured to determine which sub-area of the area the electronic device 1 is currently located in based on the one or more wireless signals and provide one or more functions based on which sub-area of the area the electronic device 1 is currently located in.

The following location-based functions may be provided, for example, based on the wireless signals received from the one or more beacon systems:
- Automatic switching on/off lights in the room when the mobile device 1 enters/leaves the room. Sub-area-based.
- Follow-me light. Light settings follow the mobile device 1 from one room to another. Sub-area-based.
- Show light controls (e.g. a color picker) of the light closest to the mobile device 1. Proximity-based.
- Select and/or sort light controls based on which room the mobile device 1 is in. As a first example, a user may be able to select certain preferred light controls for the lights in a certain room and configure the mobile device 1 such that these preferred lights controls are automatically shown when the mobile device 1 enters this certain room. As a second example, a user may be able to create a group light control that simultaneously controls settings of a group of lights in a certain room, e.g. reflecting a certain mood/atmosphere, and configure the mobile device 1 such that the group light control is automatically shown when the mobile device 1 enters this certain room.
- Automatic commissioning of lights. Automatically assigning a sub-area/room to a newly added light. Sub-area-based.
- Dynamic rendering. Light effects that seem to move through a room. Sub-area-based.

Figure 4:
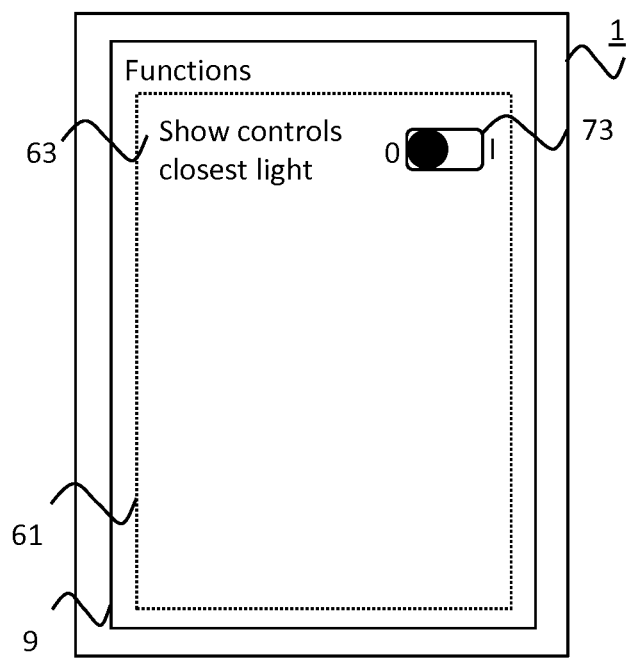
FIG. 4 shows a first example screen of a user interface for enabling and disabling location-based functions.

In an embodiment, the processor 5 is configured to determine which location-based functions are available based on the quantity of the local beacon systems and/or the locations of the local beacon systems, and provide a user interface which allows a user of the electronic device 1 to enable or disable at least one of the available location-based functions, e.g. using a user interface such as the one shown in FIG. 4. In the example screen shown in FIG. 4, only the location-based function of showing light controls of the light closest to the mobile device 1, identified in sub-area 63, is listed in screen 61, which lists the available location-based functions, because none of the lights 21 to 24 have been assigned to a room yet. This function can be enabled and disabled with switch 73. No functions may be listed in screen 61 if none of the identified lights support location-based services. The user interface may provide a recommendation to the user to install certain beacon systems, e.g. in certain sub-areas, so that certain location-based functions can be enabled.

Figure 5:
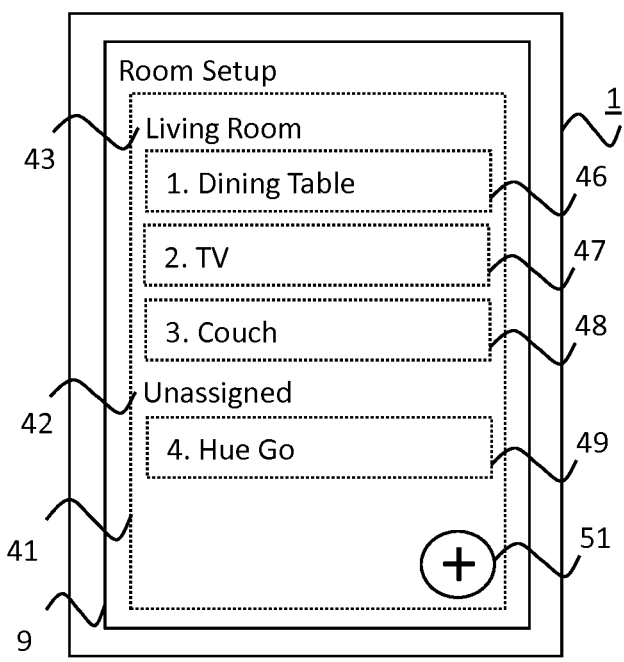
FIG. 5 shows a second example screen of a user interface for associating local beacon systems with an area.

In the example screen shown in FIG. 5, the lights identified in sub-areas 46, 47 and 48 have been associated with a group 43 named "Living Room" in "Room Setup" screen 41. As a result, certain location-based functions may be provided when the mobile device 1 is located in the living room 15 and/or certain location-based functions may be determined to be available when mobile device 1 is located in home 11. In the former case, the processor 5 is configured to determine which sub-area of the area the electronic device 1 is currently located in based on the one or more wireless signals and provide one or more location-based functions in dependence on at least one of the local beacon systems being associated with the determined sub-area. In the latter case, the processor 5 is configured to determine one or more location-based functions to be available if at least one of the local beacon systems is associated with an sub-area of the area.

Figure 6:
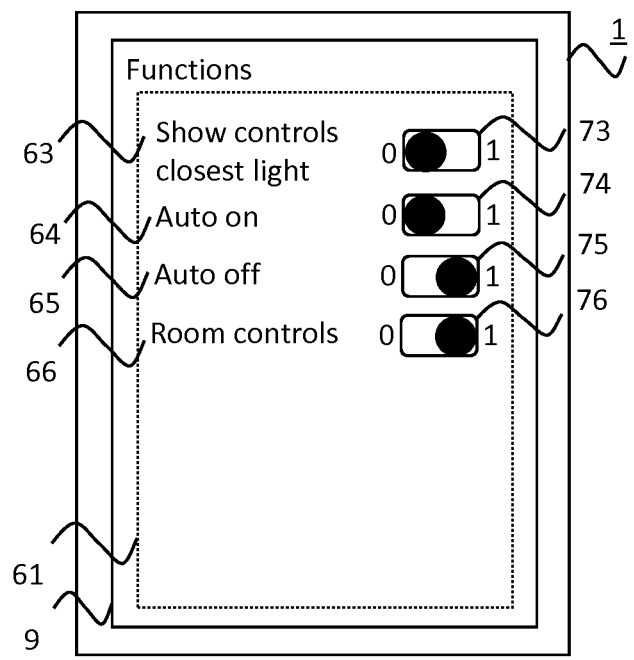
FIG. 6 shows a second example screen of a user interface for enabling and disabling location-based functions.

FIG. 6 shows a second example of screen 61, which lists the available location-based functions. In the screen shown in FIG. 6, three additional location-based functions have become available compared to FIG. 4. This is the result of lights 21 to 23 being associated with the living room 15 in the user interface of FIG. 5. A location-based function of automatically switching on lights is identified in sub-area 64 and can be enabled and disabled with switch 74. A location-based function of automatically switching off lights is identified in sub-area 65 and can be enabled and disabled with switch 75. A location-based function of selecting and/or sorting light controls based on which room the mobile device 1 is identified in sub-area 66 and can be enabled and disabled with switch 76. When these additional location-based functions are enabled, they will be provided as soon as the mobile device 1 enters the living room 15. There may be another check when the mobile device 1 enters the living room 15 whether at least one of the local beacon system is still associated with the living room 15, e.g. to check whether the power to the light(s) in the living room 15 has not been switched off recently.

Figure 7:
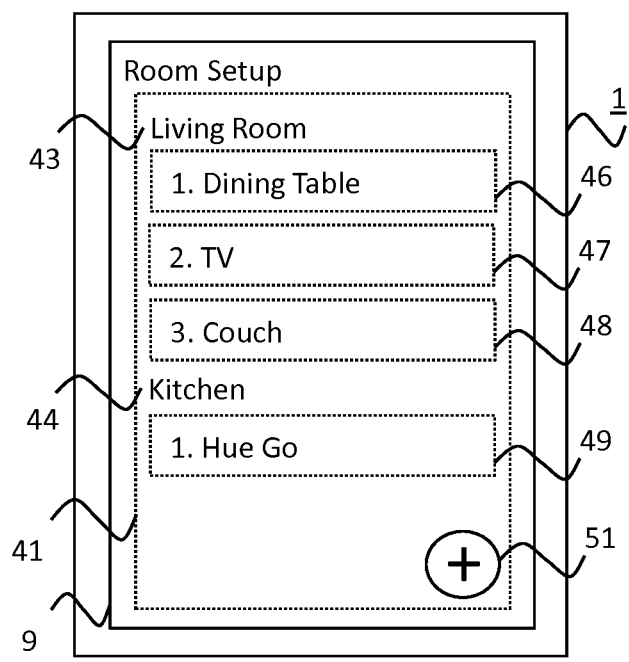
FIG. 7 shows a third example screen of a user interface for associating local beacon systems with an area.
Figure 8:
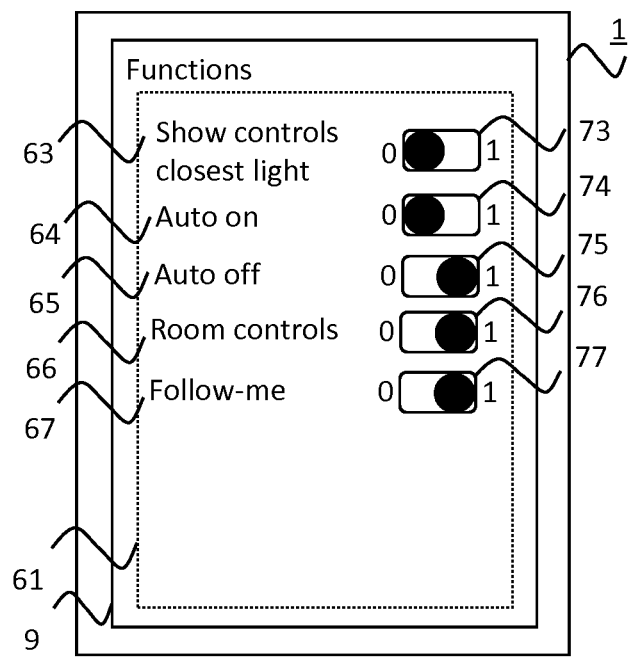
FIG. 8 shows a third example screen of a user interface for enabling and disabling location-based functions.

In the example screen shown in FIG. 7, the light identified in sub-area 49 has been associated with a group 44 named "Kitchen" in "Room Setup" screen 41. This results in light 24 being associated with a different sub-area of the home 11 than lights 21 to 23. In an embodiment, the processor 5 is configured to determine one or more location-based functions to be available if at least two of the local beacon systems are associated with different sub-areas of the area. This is shown in the example screen of FIG. 8. In the screen shown in FIG. 8, one additional location-based function has become available compared to FIG. 6. A location-based function of having the light settings follow the mobile device 1 from one room to is identified in sub-area 67 and can be enabled and disabled with switch 77. This location-based function can only be used if at least two rooms, each having at least one light, have been defined.

Figure 9:
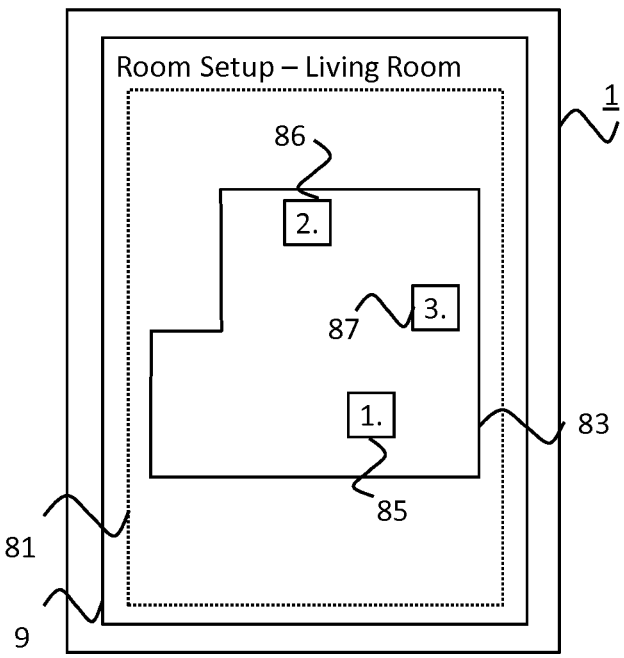
FIG. 9 shows a fourth example screen of a user interface for associating local beacon systems with an area.

FIG. 9 shows an example of a user interface in which the lights associated with a certain room can be associated with positions. A representation 83 of the living room 15 is displayed on screen 81. This representation 83 may have been drawn by the user. A user can move the light representations 85, 86 and 87 on screen 81 to specify the positions of the lights 21, 22 and 23 identified in sub-areas 46, 47 and 48 of FIG. 7, respectively. As a result, certain location-based functions that use these positions may be provided when the mobile device 1 is located in the living room 15 and/or certain location-based functions that use these positions may be determined to be available when mobile device 1 is located in home 11.

Figure 10:
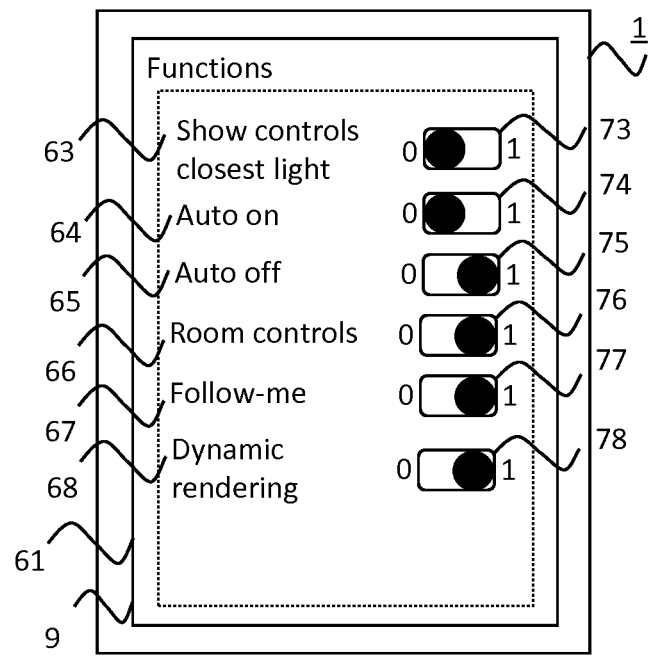
FIG. 10 shows a fourth example screen of a user interface for enabling and disabling location-based functions.

A minimum quantity of local beacon systems may need to be associated with positions. For example, the processor 5 may be configured to determine one or more location-based functions to be available in dependence on at least a minimum quantity of the local beacon systems being associated with positions within an sub-area of the area. In the screen shown in FIG. 10, one additional location-based function is available compared to FIG. 8. A location-based function of dynamically rendering light effects is identified in sub-area 68 and can be enabled and disabled with switch 78. This location-based function is available, because at least two local beacon systems have been associated with positions in the user interface of FIG. 9.

In the latter embodiment, a user may be able to enable or disable the dynamic rendering function independent of whether the mobile device 1 is located in living room 15, kitchen 14 or hall 13, but the dynamic rendering function may only be provided when the mobile device is located in living room 15. The processor 5 may be configured to determine which sub-area of the area the mobile device 1 is currently located in based on the one or more wireless signals and provide one or more location-based functions in dependence on at least a minimum quantity of the local beacon systems being associated with positions within the determined sub-area.

Figure 11:
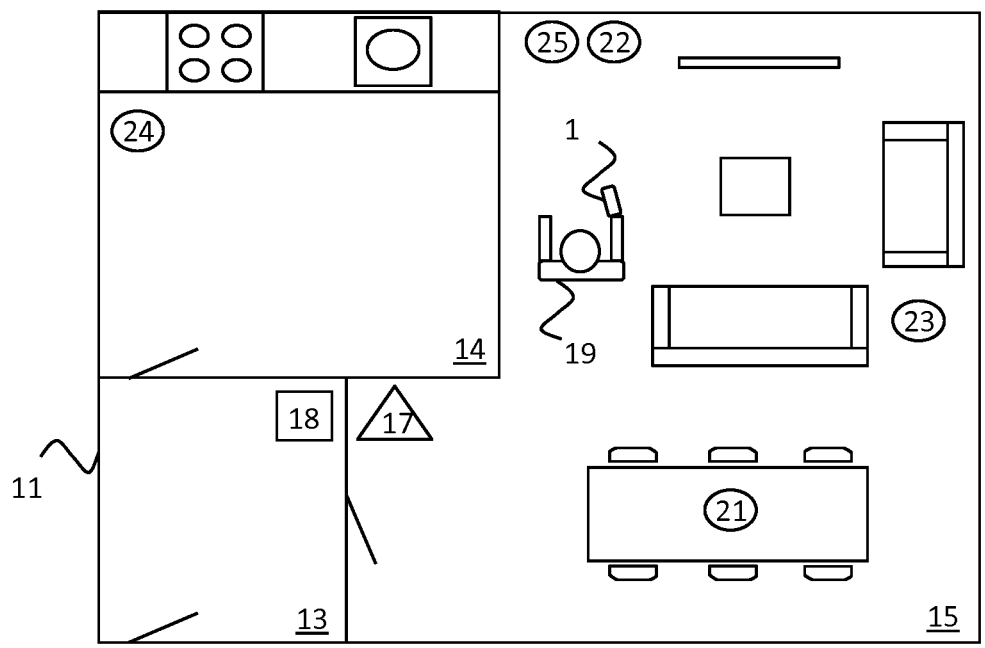
FIG. 11 shows a second example of beacon systems present in an area.

In the area depicted in FIG. 11, an additional beacon system, i.e. light 25, is present in the living room 15 compared to the area depicted FIG. 1. Light 25 is located near light 22. In an embodiment, the processor 5 is configured to determine which of the one or more beacon systems, i.e. lights 21, 22, 23 and 25, is closest to the mobile device 1 based on the received one or more wireless signals and not to provide one or more location-based functions if the closest beacon system, e.g. light 22, is located within a certain distance of another one of the one or more beacon systems, e.g. lights 21, 23 and 25. For example, instead of showing the light controls of the beacon system detected to be closest to the mobile device 1 (light 22 or 25), the light controls of the current room (living room 15) are shown on the mobile device 1.

Figure 12:
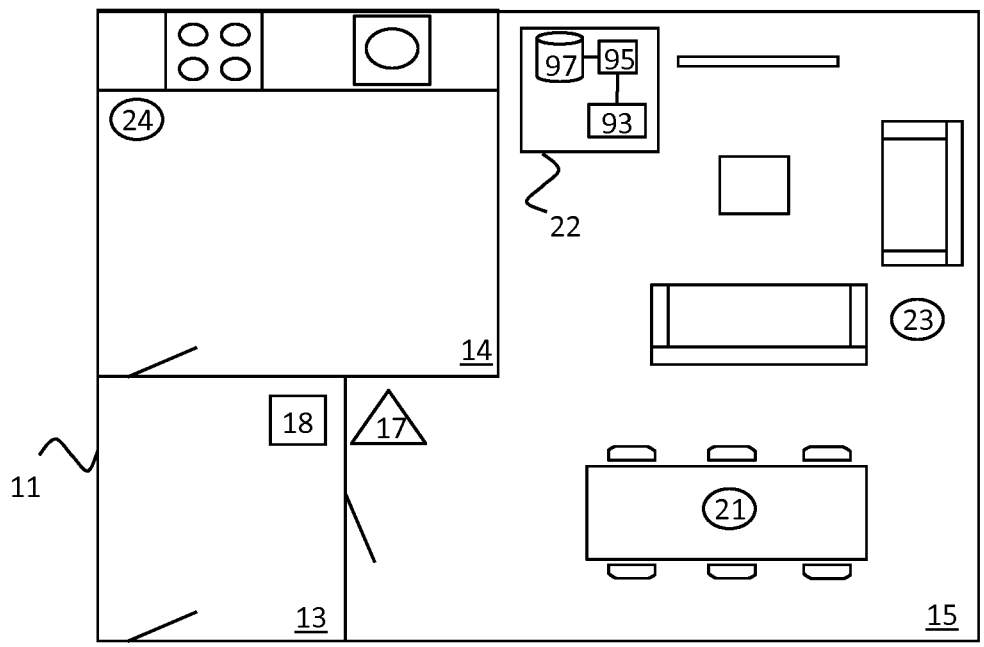
FIG. 12 is a block diagram of a second embodiment of the electronic device of the invention.

In the embodiment shown in FIG. 12, the invention is implemented in the light 22 instead of the mobile device 1. The light 22 comprises a processor 95, a receiver 93 and a memory 97. The processor 95 is configured to use the receiver 93 to receive one or more wireless signals from one or more beacon systems, e.g. lights 21 and 23. The one or more wireless signals identify the one or more beacon systems. The processor 5 is further configured to identify local beacon systems, e.g. lights 21, 23 and 24, which are present in the same area as the light 22, and determine a quantity of the local beacon systems and/or locations of the local beacon systems. The processor 95 is also configured to provide one or more location-based functions based on the one or more wireless signals in dependence on the quantity of the local beacon systems and/or the locations of the local beacon systems. The processor 95, the receiver 93 and the memory 97 may be similar hardware components as processor 5, receiver 3 and memory 7.

In the embodiment shown in FIG. 12, the processor 95 is configured to identify a sub-area of the area per beacon system for the one or more beacon systems, e.g. lights 21 and 23, determine an average received signal strength (e.g. RSSI) per sub-area for the identified sub-areas, determine which of the average received signal strengths is highest, determine a quantity of beacon systems in the sub-area with the highest average received signal strength and provide one or more location-based functions in dependence on the determined quantity of beacon systems. For example, the location-based function may be the automatic commissioning of the light 22. If the sub-area, e.g. room, of the area, e.g. home, can be determined for the light 22 sufficiently reliably, the sub-area may be associated with the light 22 so that it may provide other location-based functions. In an embodiment, the processor 5 of mobile device 1 is configured in a similar manner e.g. to determine in which room the mobile device 1 is located.

If the light 24 is moved to a position near the wall between the kitchen 14 and the living room 15 so that the light 22 is able to receive a wireless signal from the light 24, the light 22 may receive a wireless signal with a received signal strength of −80 dBm from light 24. Since light 24 is the only beacon system in the kitchen 14, the average received signal strength for the kitchen 14 is −80 dBm. The light 22 further determines an average received signal strength of −70 dBm for the living room 15 based on the signal strengths of the wireless signals received from the beacon systems in the living room 15, i.e. lights 21 and 23. Since the average received strength for the living room 15 is higher than the average received signal strength for the kitchen 14, it is determined that the light 22 is likely located in the living room 15. A confidence level of this determination is estimated based on the quantity of beacon systems known to be in the living room 15, i.e. two (lights 21 and 22). For example, the confidence level may be higher for two beacon systems than for one beacon system and higher for three beacon systems than for two beacon systems. Other factors may also be taken into account in the confidence level, e.g. the difference between the highest and second highest average received signal strength. If the confidence level is sufficiently high, e.g. exceeds a certain threshold, location-based functions may be provided that use the living room 15 as location input.

The above-described method of identifying a sub-area of the area per beacon system can be further improved with the help of training (calibration). The system can be trained to learn which minimum signal strength(s) may be received from a certain beacon system in a certain sub-area. For example, the system may learn that if the system receives a wireless signal with a received signal strength stronger than −65 dBm from light 21 or a wireless signal with a received signal strength stronger than −68 dBm from light 23, it is located in the living room 15. At this position, it is sufficient to receive a wireless signal from one beacon system. The system may further learn that if the system receives both a wireless signal with received signal strength stronger than −70 dBm from light 21 and a wireless signal with received signal strength stronger than −75 dBm from light 23, it is located in the living room 15. At this position, it may not be sufficient to receive a wireless signal from one beacon system, but it is sufficient to receive a wireless signal from two beacon systems.

There are multiple possible ways of performing the training:

Room walkthrough—during first time use, the user walks around the boundaries of each room so from corner to corner—with his phone in his hand to communicate the actual boundaries of a room to the system.

Key areas—during first time use, the user spends a few seconds at some locations in his home that he typically spends a lot of time at—for example at his dining table, on his couch, in his bed and standing next to his stove in his kitchen—with the phone in his hand to communicate locations at which he is likely to stay to the system.

Defining entries—during first time use, he spends a few seconds at each entry of the rooms in his house, with his phone in his hand to communicate the points, where he enters each room, to the system.

Provide corrections—in case that during the use of the system, it incorrectly informs the user about entering a different room, or approaching a specific light, he communicates to the system it has made a mistake.

Provide feedback—during the use of the system, it occasionally asks the user to confirm that he is present in a specific room—like the kitchen, living room or bedroom—so the system learns in which cases it was correct or not.

Figure 13:
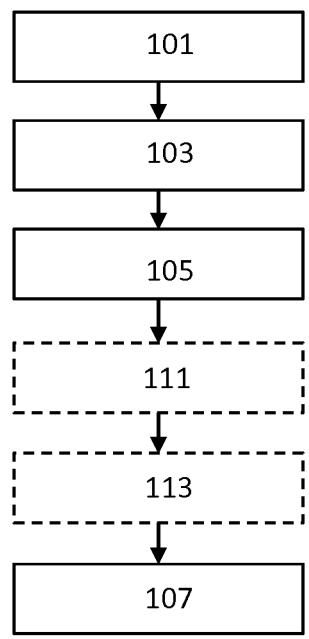
FIG. 13 is a flow diagram of an embodiment of the method of the invention.

A first embodiment of the method of providing location-based functions is shown in FIG. 13. A step 101 comprises receiving, on an electronic device, one or more wireless signals from one or more beacon systems. The one or more wireless signals identify the one or more beacon systems. A step 103 comprises identifying local beacon systems which are present in the same area as the electronic device. A step 105 comprises determining a quantity of the local beacon systems and/or locations of the local beacon systems. A step 107 comprises providing one or more location-based functions on the electronic device based on the one or more wireless signals in dependence on the quantity of the local beacon systems and/or the locations of the local beacon systems.

In the embodiment of FIG. 13, the method further comprises steps 111 and 113. Step 111 comprises determining which location-based functions are available based the quantity of the local beacon systems and/or the locations of the local beacon systems. Step 113 comprises providing a user interface which allows a user to enable or disable at least one of the available location-based functions.

Figure 14:
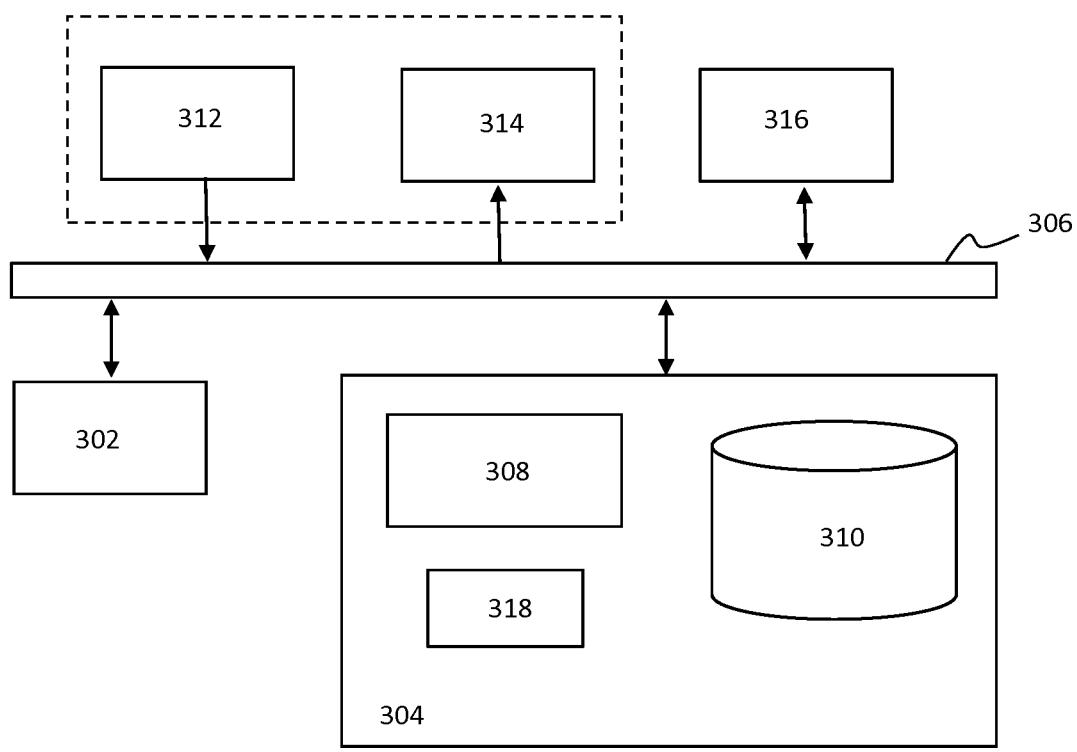
FIG. 14 is a block diagram of an exemplary data processing system for performing the method of the invention.

FIG. 14 depicts a block diagram illustrating an exemplary data processing system that may perform the method as described with reference to FIG. 13.

As shown in FIG. 14, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution.

Input/output (I/O) devices depicted as an input device 312 and an output device 314 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 14 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 14, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 14) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. An electronic device, comprising:
   at least one receiver; and
   at least one processor configured to:
      use said at least one receiver to receive one or more wireless signals from one or more beacon systems, said one or more wireless signals identifying said one or more beacon systems;
      identify local beacon systems which are present in the same area as said electronic device;
      determine a quantity of said local beacon systems and/or locations of said local beacon systems;
      determine which location-based functions are available based on said quantity of said local beacon systems and said locations of said local beacon systems; and
      provide one or more available location-based functions based on said one or more wireless signals in dependence on said quantity of said local beacon systems and said locations of said local beacon systems,
   wherein said at least one processor is configured to determine which of said one or more beacon systems is closest to said electronic device based on said received one or more wireless signals and not to provide one or more location-based functions if said closest beacon system is located within a certain distance of another one of said one or more beacon systems.

2. The electronic device as claimed in claim 1, wherein said at least one processor is configured to provide a user interface which allows a user of said electronic device to enable or disable at least one of said available location-based functions.

3. The electronic device as claimed in claim 1, wherein said at least one processor is configured to determine which of said one or more beacon systems is closest to said electronic device based on said received one or more wireless signals and provide one or more functions based on which of said of said one or more beacon systems is closest to said electronic device.

4. The electronic device as claimed in claim 1, wherein said at least one processor is configured to determine which sub-area of said area said electronic device is currently located in based on said one or more wireless signals and provide one or more functions based on which sub-area of said area said electronic device is currently located in.

5. The electronic device as claimed in claim 1, wherein said at least one processor is configured to determine one or more location-based functions to be available in dependence on at least a minimum quantity of said local beacon systems being associated with positions within an sub-area of said area.

6. The electronic device as claimed in claim 1, wherein said at least one processor is configured to determine which sub-area of said area said electronic device is currently located in based on said one or more wireless signals and provide one or more location-based functions in dependence on at least a minimum quantity of said local beacon systems being associated with positions within said determined sub-area.

7. The electronic device as claimed in claim 1, wherein said at least one processor is configured to determine one or more location-based functions to be available if at least one of said local beacon systems is associated with a sub-area of said area.

8. The electronic device as claimed in claim 1, wherein said at least one processor is configured to determine one or more location-based functions to be available if at least two of said local beacon systems are associated with different sub-areas of said area.

9. The electronic device as claimed in claim 1, wherein said at least one processor is configured to determine which sub-area of said area said electronic device is currently located in based on said one or more wireless signals and provide one or more location-based functions in dependence on at least one of said local beacon systems) being associated with said determined sub-area.

10. The electronic device as claimed in claim 1, wherein said at least one processor is configured to identify an sub-area of said area per beacon system for said one or more beacon systems, determine an average received signal strength per sub-area for said identified sub-areas, determine which of said average received signal strengths is highest, determine a quantity of beacon systems in the sub-area with the highest average received signal strength and provide one or more location-based functions in dependence on said determined quantity of beacon systems.

11. A method of providing location-based functions, comprising:
   receiving, on an electronic device, one or more wireless signals from one or more beacon systems, said one or more wireless signals identifying said one or more beacon systems;
   identifying local beacon systems which are present in the same area as said electronic device;
   determining a quantity of said local beacon systems and/or locations of said local beacon systems;
   determining which location-based functions are available based on said quantity of said local beacon systems and said locations of said local beacon systems,
   providing one or more available location-based functions on said electronic device based on said one or more wireless signals in dependence on said quantity of said local beacon systems and said locations of said local beacon systems, and
   determining which of said one or more beacon systems is closest to said electronic device based on said received one or more wireless signals and not providing one or more location-based functions if said closest beacon system is located within a certain distance of another one of said one or more beacon systems.

12. The method as claimed in claim 11, further comprising providing a user interface which allows a user to enable or disable at least one of said available location-based functions.

13. A non-transitory computer-readable medium comprising computer program code which, when run on a computer processor, performs the method of claim 11.

* * * * *